United States Patent Office 2,951,315
Patented Sept. 6, 1960

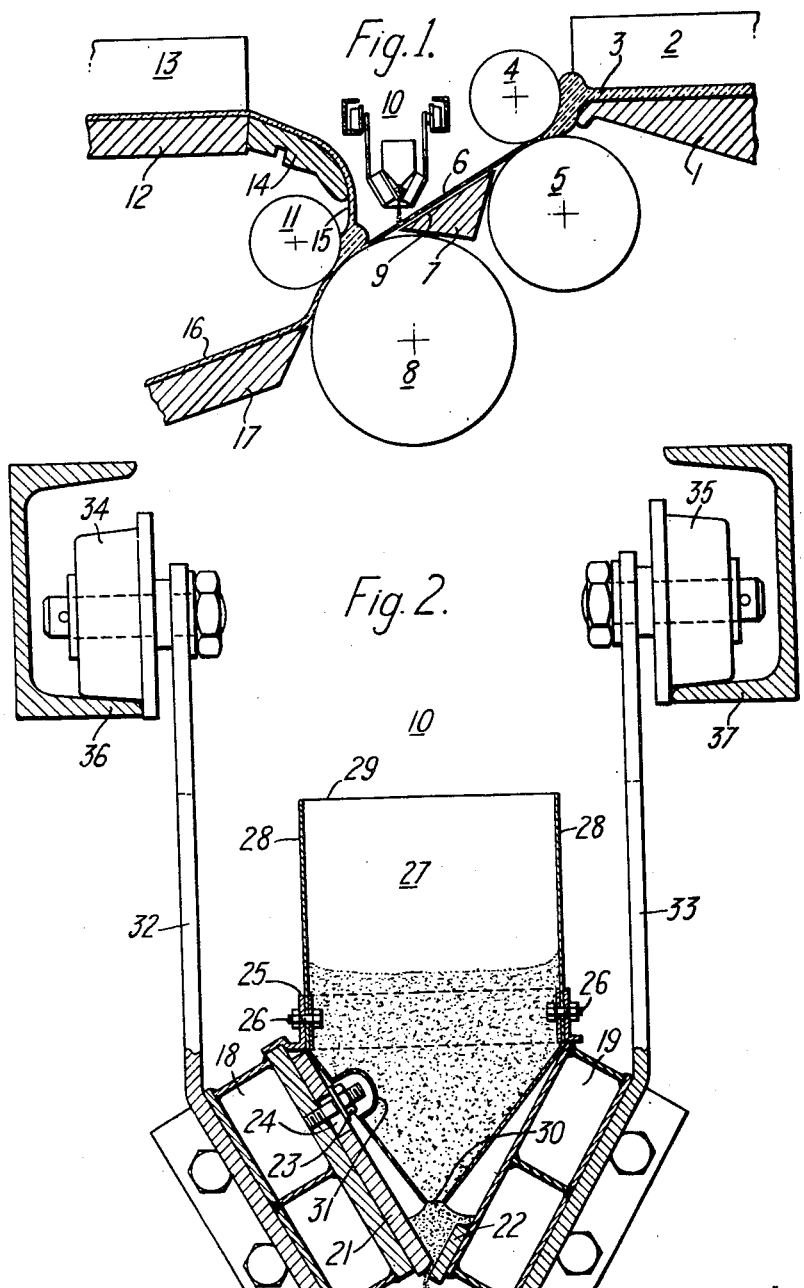

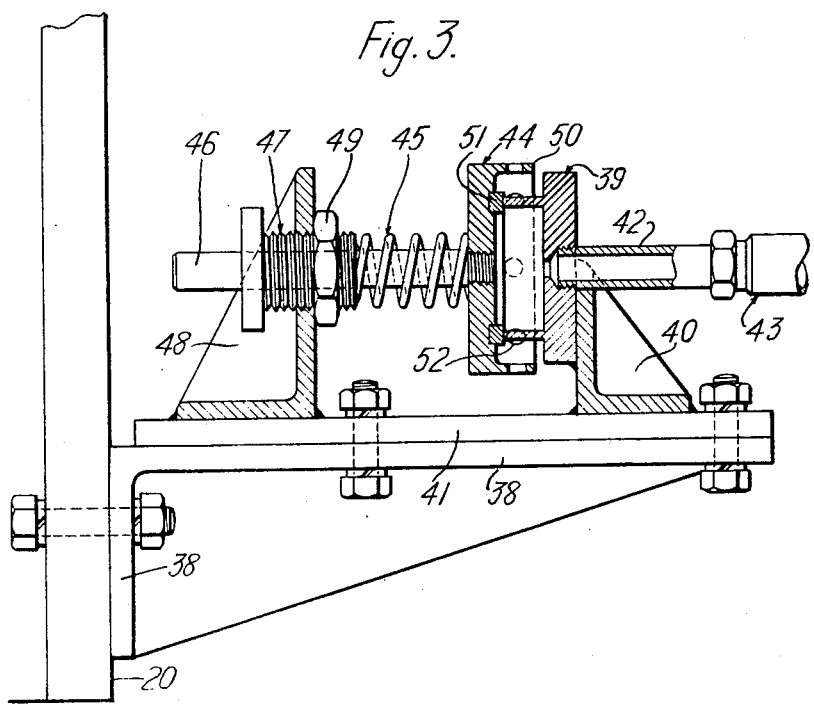

2,951,315

APPARATUS FOR MANUFACTURING ORNAMENTED FLAT GLASS

Frank Cousen, Windle, near St. Helens, and George H. Oxley, St. Helens, England, assignors to Pilkington Brothers Limited, Liverpool, England, a corporation of Great Britain Filed Dec. 12, 1955, Ser. No. 552,531

Claims priority, application Great Britain Dec. 14, 1954

3 Claims. (Cl. 49—3)

This invention relates to improvements in or relating to apparatus for manufacturing ornamented flat glass, and has for its main object to devise an apparatus for producing an ornamented glass in which the ornamentation is of uniform character and is incorporated within the body of the glass, the manner of incorporation being such that diffusion of the ornamenting layer with the other glass is prevented thereby obtaining a clear line of demarcation.

A continuous method of manufacturing ornamented flat glass in solid ribbon form with the apparatus of the present invention is characterized by simultaneously and progressively producing two ribbon components of glass having similar coefficients of expansion so that one component can be applied to the other in a plastic state and interposing a layer of a different glass composition having a comparatively low melting point by distributing a frit from which the interposed layer is formed on the face of one of the two ribbon components in a zone where the heat in the ribbon will melt the applied frit, whereupon this frit lying on the ribbon component as the latter advances, is melted and spreads out as a layer covering the ribbon, and the layer thereby fused to the ribbon, and thereupon covering the melted layer so formed with the other ribbon component, the heat in the said other component also being such as to fuse the interposed ornamenting layer to the said other ribbon component whereby the two components and the interposed layer become bonded together, the physical state of the two ribbon components when fusing the interlayer, being such as to resist diffusion of the interlayer into the respective components.

The vitreous frit employed may be a lead borosilicate enamel frit having a melting point of 500°–520° C., though of course other frit having a low softening temperature can be employed.

As a result of carrying out a method of manufacturing with the apparatus of the invention a sandwich of glass is obtained in which the ornamenting layer is clearly defined.

The method of manufacturing ornamented glass in solid ribbon form with the apparatus of the present invention may be further characterized in that the first component ribbon is formed by rolling and an ornamental pattern is impressed on its upper surface as it is rolled into the ribbon form.

In such case the layer produced on the figured surface of the first component ribbon may be formed from a vitreous frit of a glass which has a refractive index different from that of the glass in the component ribbons of the ultimate ornamented composite ribbon, thus brightly delineating the pattern impressed on the component ribbon as it is rolled out. The layer so defined may be formed from a frit which gives a layer which may be transparent and either colourless or tinted, or a layer which may be translucent and either colourless or tinted, or a layer which may be opaque and either colourless or tinted.

The invention further comprehends apparatus for manufacturing ornamented flat glass in ribbon-form which comprises on one side of a main roller means for flowing a ribbon of glass over the crown of the roller and, on the other side of the main roller, means for flowing a ribbon of glass to the ribbon on the crown of the main roller, a pressure roller operatively associated with the main roller to exert a pressure on the glass leaving the main roller to constitute the desired ultimate ribbon, a hopper for the frit disposed over the said zone and means for vibrating the hopper whereby a frit in the hopper may be caused to fall on to the surface of the first said ribbon exposed over the main roller.

Preferably the hopper is, generally speaking, of V section and is constituted between water boxes connected by end plates, the mouth of the hopper being constituted between relatively movable plates carried by the hopper structure and relatively disposed so that the mouth is constituted as an elongated slot extending along the bottom of the hopper and downwardly therefrom; the general plane of the slot is preferably inclined to the plane of symmetry of the hopper and extends downwardly therefrom. The hopper structure supports a bin depending into the hopper, the bin comprises four walls, the opposed walls which face the water boxes being mutually inclined and terminating in spaced relation to form a mouth for the bin in the plane of symmetry of the hopper and at a suitable level in the hopper, whereby a constant head obtains on the frit leaving the hopper, and the frit within the hopper is shielded from the radiant heat of the ribbon of glass passing over the main roller.

By such construction the passage of the frit from the hopper is maintained free of obstruction which might be caused by the formation of molten glass in the hopper, and the frit continually falls as a powder on to the component ribbon where it is converted by the heat in the ribbon into the ornamenting fused layer.

The fused layer produced in accordance with the invention will have a width corresponding to the actual length of the hopper mouth, but this may be shortened by positioning stop plates in the hopper mouth and adjacent the end plates.

To assure a constant flow of frit the hopper structure is vibrated at a frequency of about 120–130 impulses per second, such vibrations may be imparted by utilising a pneumatic device capable of being vibrated at the desired frequency and mounted on the hopper so that the vibrations produced, set up or generate vibrations in the hopper in contradistinction to directly hammering the hopper. The device is fixed to the hopper so that the axis or line of the vibrations produced is parallel to the mouth of the hopper.

In order that the invention may be more clearly understood one preferred embodiment will now be described with reference to the accompanying drawing.

In the drawing:

Fig. 1 is a diagrammatic sectional elevation of apparatus for flowing towards one another two ribbons of glass and for forming an ornamenting layer between them;

Fig. 2 is a diagrammatic sectional elevation to a much larger scale of the frit hopper shown in the arrangement illustrated in Fig. 1, and Fig. 3 shows in sectional elevation, to a larger scale, a suitable form of vibrating device to be used with the hopper.

Like references designate the same parts.

Referring first to Figure 1 of the drawing: From the floor 1 of a spout of known form, comprising side walls 2, of the forehearth of a glass melting furnace (not shown) is flowed molten glass 3, which passes between sizing rolls 4, 5 and emerges as a ribbon 6, herein sometimes referred to as "the first ribbon component" which is directed by a metal support 7 to the crown of a main roller 8, the support 7 comprising a supporting surface 9 for the ribbon, which is disposed in a plane which is tangential to the surface of the main roller 8.

In the passage of the glass from the spout to the main roller the ribbon is sized and accordingly there is a loss of heat by conduction to the rolls 4, 5 and there is also a loss of heat in traversing the supporting surface 9.

Above the crown of the main roller is suitably suspended at the required height above the ribbon 6 a hopper structure generally indicated at 10 which holds the requisite frit from which an ornamenting layer is formed on the ribbon 6. The frit, which, if an opaque layer is required, may be a lead borosilicate enamel frit, flows regularly from the hopper, as hereinafter fully explained, on to a zone of the ribbon 6 extending over the lower end of the support 7 to the main roller 8 on which zone the frit is converted into a liquid state by the heat in the ribbon and spreads rapidly over the ribbon as a layer thereon.

Accordingly it will be observed that the zone on which the frit falls consists of glass holding sufficient heat to melt all the frit distributed on the zone and produce a fused layer thereof on the said first ribbon component.

The ribbon with the layer is drawn over the main roller by a roller 11 disposed on the other side of the main roller 8 to that on which the sizing rolls 4, 5 are disposed, the roller 11 being a pressure roller co-operating with the main roller 8 to constitute a pair of sizing rolls from which the ultimate composite ribbon is produced.

A second spout of known form, and comprising a floor 12 and side walls 13, of a forehearth of the glass melting furnace which supplies the spout 1, 2, but is not shown, is provided with an extended lip 14 which curves down towards the main roller 8 and directs the molten glass leaving the respective spout on to the ribbon 6 before the latter arrives at the pass between the roll 11 and roller 8. Thus the layer formed on the ribbon 6 is covered by the glass leaving the lip 14 as a ribbon 15 herein sometimes referred to as "a second component ribbon," and the ultimate finally sized ribbon 16 leaving the pass between the roll 11 and the main roller 8 has located in the body of the ribbon an ornamental layer formed from the frit leaving the hopper structure 10.

The physical state resulting in particular from temperature, composition of the glass in the ribbon 6 and of the glass 15 used for covering the layer formed on the ribbon 6 is such as to control diffusion of the layer into these glasses while giving a bond of adequate strength between them and the layer and locate the ornamentation within the body of the ultimate composite ribbon.

The coefficient of thermal expansion of the layer is such as to avoid permanent stresses in the glass of the ultimate composite ribbon in the vicinity of the bond between the layer and the incorporating glass after it has passed through a lehr in normal manner for regulating the cooling of the glass, to which lehr (not shown) the ultimate composite ribbon 16 is directed by a support indicated at 17 on which the ribbon 16 arrives on leaving the main roller 8.

The vitreous enamel frit is distributed on to the ribbon component 6 of the ultimate ribbon 16 from a hopper formed between two water boxes 18, 19 connected at each end by a plate 20, the mouth of the hopper being defined between the lower end of an adjustable plate 21 on the water box 18, and the face of a plate 22 fixed on the water box 19. The mouth of the hopper is thus constituted as an elongated slot extending along the bottom of the hopper and extending downwardly therefrom, the plane of the slot being inclined to the plane of symmetry of the hopper and extending downwardly therefrom. Any adjustment of the plate 21 relatively to the plate 22 is obtained by means of a clamping device indicated at 23 which passes through a slot 24 in the plate, as will be readily understood.

By using the plates 21, 22 on the water boxes the mouth of the hopper is shielded and protected from the heat radiated from the ribbon 6 to an extent to prevent the formation of molten frit in the hopper.

On the water boxes 18, 19 and end plate 20 is erected a rectangular frame member 25 in which is secured as indicated at 26 a frit bin 27, the bin having two side walls 28 and two end walls 29 (one only of which is shown). Below the frame 25 the end walls 29 are tapered and the side walls 28, where they face the water boxes are mutually inclined and terminate in spaced relation to form a mouth 30 for the bin. The part of the wall 28 over the adjusting device 23 is channelled as indicated at 31 so that the device does not interefere with the disposal of the mouth 30 of the bin above the mouth of the hopper in the plane of symmetry of the hopper structure. Thus is obtained a constant head on the frit leaving the hopper structure.

To the end plates and water boxes straps 32 and 33 are secured and at the upper ends of the straps wheels 34, 35 are mounted, which run on members of a supporting framework indicated at 36 and 27. Thus the hopper structure can be readily moved to operative position over the ribbon 6 or to the side thereof for charging or when not required as a means of flowing frit on to the ribbon 6.

The sizing roll 4 may have an engraved or embossed surface by which an ornamental pattern can be impressed on the upper surface of the ribbon 6 and the frit used may, instead of being a vitreous enamel frit, be a frit which gives a clear layer of glass having a : fractive index which is different from that of the ribbon 6 or of the covering glass so that the configuration is given a brilliance which delineates the impressions formed by the roller 4.

In order to set up vibration of the desired frequency in the hopper structure, a pneumatic vibrator is fixed to one of the end plates 20, by means of a bracket 38. The pneumatic device comprises a cup 39 which is welded to a bracket 40 in turn secured to a base plate 41 bolted to the bracket 38, on the hopper. Air under pressure is supplied to the cup by a nozzle member 42 connected by hose 43 to a supply main (not shown). A cover member 44 is applied to the rim of the cup 39 by a spring 45 disposed on a coaxial rod 46 threaded into the cover 44. The rod 46 is carried by an externally threaded bushing 47 so as to be disposed parallel with the mouth of the hopper, and the bushing is adjustably engaged on a bracket 48 and adapted to be fixed in any position of adjustment by the locking nut 49 which abuts the bracket 48.

By adjusting the bushing the pressure exerted by spring 45 on the cover member 44 may be varied. The cover member 44 includes an apertured rim 50 and carries a sealing ring 51 on which is normally seated the rim 52 of the cup member 39.

When air under pressure is admitted through nozzle 42 there is a pressure build up between the elements 39, 44 causing a separation against the pressure of spring 45. The air then escapes between the sealing ring 51 and rim 52 and out through or past the apertured rim 50, the spring then asserts itself to force the sealing ring 51 against the cup rim 52 and so on. By such arrangement the rod 46 which is secured to the cover 44 is continuously vibrated at the requisite frequency say between 120–130 cycles per second. The vibration on the rod engenders similar vibration, through the bracket 38, on the hopper structure thus assuring a constant flow from the hopper.

In order to ensure free movement of the frit from the hopper, a wire mesh is disposed across the full length of the mouth of the hopper and on the inside of the hopper and a rotatable brush mounted on the end walls 29 of the hopper driven in any suitable manner is employed to brush the frit through the wire mesh, in known manner to the hopper mouth, the mesh and brush being disposed so that the mesh is tangential to the brush.

By the present invention ornamented flat glass can be economically produced in continuous ribbon form, the body of the ribbon incorporating the ornamentation while the surfaces of the ribbon are smooth, and if a coloured layer is incorporated the colour aspect from both surfaces is the same. The ornamented ribbon thus produced may be used in the manufacture of tiles for walls or ceilings and can be used on a light-reflecting surface.

By using a frit which produces a translucent layer the ultimate composite ribbon is given obscuring properties which make it suitable for use in the windows of enclosures or vehicles in which privacy is required.

We claim:

1. Apparatus for manufacturing ornamented flat glass in ribbon form comprising glass melting furnace means having two discharge spouts for molten glass, a main roller, means including sizing rolls between one of said spouts and said main roller for forming a ribbon of glass and for directing the formed ribbon onto the crown of the main roller, the other spout being adapted to flow a ribbon of glass to the ribbon on the crown of the main roller, a pressure roller operatively associated with the main roller to exert a pressure on the glass leaving the main roller to constitute the desired ultimate composite ribbon, a hopper for frit disposed over the zone where the heat in the first mentioned ribbon will fuse the frit, and means for vibrating the hopper, whereby a frit in the hopper may be caused to fall on the surface of the first mentioned ribbon whilst the latter ribbon is exposed in the vicinity of the main roller.

2. Apparatus as in claim 1 wherein said ribbon directing means comprises a support for the first-mentioned ribbon in its path from the sizing rolls to the crown of the main roller and wherein the hopper is disposed over a portion of said zone whereat the melted frit will not diffuse through the first-mentioned ribbon.

3. Apparatus as in claim 1 including water boxes between said hopper and the ribbons whereby the frit within the hopper is shielded from the radiant heat of the ribbons.

References Cited in the file of this patent

UNITED STATES PATENTS

| | | |
|---|---|---|
| 772,876 | Duncan | Oct. 18, 1904 |
| 1,342,282 | Gleason | June 1, 1920 |
| 1,563,584 | O'Shaughnessy | Dec. 1, 1925 |
| 1,642,441 | Hommel | Sept. 13, 1927 |
| 1,734,965 | Danner | Nov. 12, 1929 |
| 1,748,587 | Smedley | Feb. 25, 1930 |
| 2,177,000 | Nash | Oct. 24, 1939 |
| 2,251,144 | Lytle | July 29, 1941 |
| 2,261,262 | Lewis | Nov. 4, 1941 |
| 2,264,183 | Nash | Nov. 25, 1941 |

FOREIGN PATENTS

| | | |
|---|---|---|
| 420,611 | Great Britain | Dec. 5, 1934 |